March 29, 1949.　　A. J. MONACK ET AL　　2,465,388
PROCESS FOR DRILLING GLASS-BONDED MICA
Filed Dec. 11, 1945
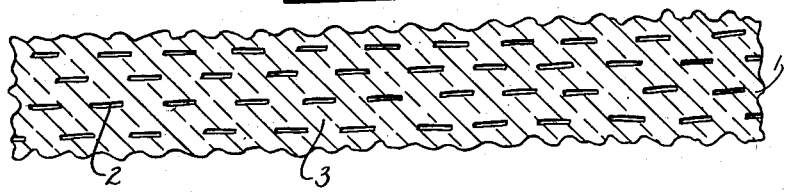
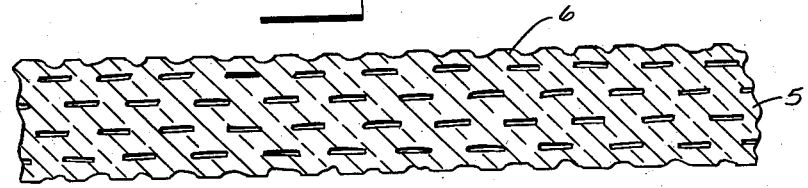
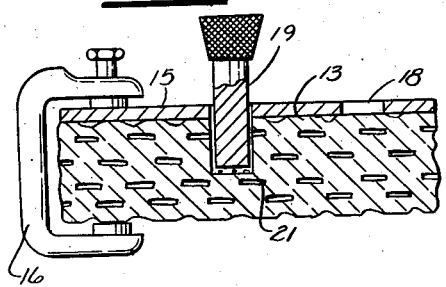
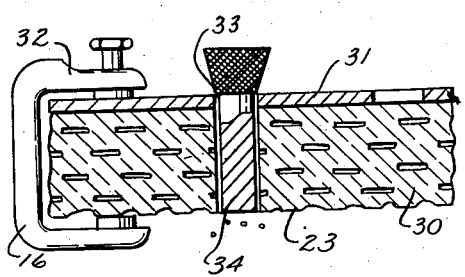
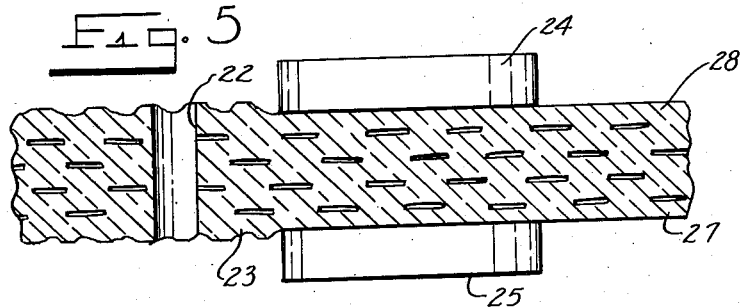
INVENTORS
ALBERT J. MONACK
VERNE MUELLER
BY
Pineles + Greene
ATTORNEYS Patented Mar. 29, 1949

2,465,388

UNITED STATES PATENT OFFICE 2,465,388

PROCESS FOR DRILLING GLASS-BONDED MICA

Albert J. Monack and Verne Mueller, Rutherford, N. J., assignors to Mycalex Corporation of America, county of Passaic, N. J., a corporation of New Jersey Application December 11, 1945, Serial No. 634,157

3 Claims. (Cl. 125—20)

This invention relates to the fabrication of a glass-bonded mica material and more particularly to a novel process for drilling glass-bonded mica in sheet form and the product produced thereby. In recent years there has been developed and used as insulation material, a glass-bonded mica. This product is composed of finely powdered mica and glass. The mica is usually of that form known as muscovite, although other forms may be employed. The glass is a relatively low melting composition of the borate or borosilicate type, which may or may not contain lead. The glass is such as to soften at a sufficiently low temperature so that it does not destroy or change the mica structure. Glass-bonded mica product is made by compression molding the mixture of glass and mica and forming the mixture into sheets, rods, disks or other shapes.

Glass-bonded mica product is primarily employed for high-frequency insulation. Because the surfaces of the product are chilled during transfer from the furnace, where the mixture is heated, to the press, where it is formed, and because of the contact with platens which must be maintained at a temperature somewhat below that of the plastic composition, the finished material is covered with a porous "skin" which is extremely deleterious electrically because of its water absorption and rough surface. This skin must be removed by wet grinding with abrasive wheels on a surface grinder.

The product may then be machined to any desired shape or dimension and holes may be drilled or tapped therein.

The glass-bonded mica insulation material thus formed has extremely desirable electrical insulating characteristics because of its resistance to temperature and chemical influences and because of its negligible water absorption.

However, because of its structure, the glass-bonded mica presents certain marked difficulties in drilling holes through the material. The mica exists in the form of a two-dimensional network of structural tetrahedra. These plates of mica are generally aligned two-dimensionally in the glass-bonded product. By reason of the pressure exerted on the material during the molding thereof, the mica plates have their flat surfaces at right angles to the direction of pressure.

It has been the practice to drill or machine holes through the glass-bonded mica by making a surface ground sheet and assembling that sheet between two heavy drilling jigs with the openings in the drill jig for the passage of the drills. Because the glass-bonded mica has a great likelihood of chipping and fracturing as the drill enters the material, passes through it, and particularly as it leaves the material, a special procedure must be followed to minimize this chipping. Thus, the operator drills a hole part way through the glass-bonded mica sheet, then reverses the sheet in its assembled drill jig and drills an opening from the other side of the sheet to join with the original opening drilled half through to form a complete opening. By this procedure, the serious chipping that occurs as the drill comes out of the glass-bonded mica is avoided, but there is still considerable chipping and fracturing at that point where the drill enters the sheet material, and the internal surface of the hole itself is normally quite rough.

Further, the operator must be extremely skilled and have a definite "feel" of the material as the drill penetrates the sheet material. Further, the operator must keep an identical vertical line for the drill and since there is a slight tolerance in the drill jig the tappings can be slightly off with respect to one another. Considerable skill is required, therefore, and relatively considerable time is required for each operation. In spite of the skill and the time required, chipping very frequently occurs as the drill enters the sheet, and the inner wall of the bore is rough, both by the chipping and the roughening being caused by the tearing loose of certain of these small mica flakes. The disadvantages of this procedure of the prior art lie, therefore, (1) in the quality of the product produced which is deficient in that surface chippings are common and internal roughness of the bore is the rule rather than the exception, and (2) because of the need for using highly skilled operators who because of the "feel" required and the double tapping, once from each surface of the material, require considerable time for the operation, and (3) because the operation must inherently be a skilled hand operation and cannot be done with multiple drill heads; (4) because the hole itself may be offset in part; (5) because relatively costly drill jigs are required.

It is the object of our invention to avoid these difficulties of the prior art and to provide a novel process for drilling glass-bonded mica.

It is a further object of the present invention to provide a means of drilling glass-bonded mica so as to avoid surface fractures and internal bore roughness.

It is a further object of the present invention to provide a process whereby glass-bonded mica can be drilled through in a single operation without incurring surface chipping or fracturing.

It is a further object of the present invention to provide a process for drilling glass-bonded mica that can be set up for automatic or multiple drill head operation.

It is still a further object of the present invention to provide a novel form of smooth surfaced, smooth bored or drilled glass-bonded mica sheet.

We accomplish these objects generally by, at most, only partially removing the rough skin originally formed during processing of the glass-bonded mica sheet and drilling through the rough skin on both surfaces of the glass-bonded mica sheet instead of drilling the ground and smooth surfaces glass-bonded mica sheet as has been the practice in the prior art. The skin is deliberately made thick enough to accomplish the object of the invention. Thus, the rough skin itself absorbs any tearing action as the bit enters and leaves the product. The debris picked up from the rough skin is carried through by the drill, and it actually acts as a grinding lubricant to provide a smooth internal bore.

After being drilled, the glass-bonded mica sheet is surfaced on a grinding wheel, the rough skin being thereby removed, and a smooth non-chipped glass-bonded mica sheet is provided.

For a detailed description of the present invention reference is made to the drawings, in which, Figure 1 is a diagrammatic cross-sectional representation of a sheet of glass-bonded mica product having the original orange peel surface.

Figure 2 is a cross sectional representation of a sheet of glass-bonded mica product with a part of the orange peel surface removed.

Figure 3 is a diagrammatic representation in cross-section of a sheet of the glass-bonded mica in the process of being drilled.

Figure 4 is a cross-sectional side diagrammatic view, generally similar to Figure 3, showing the drilling of a sheet from which part of the orange peel surface has been removed.

Figure 5 is a side view in partial cross-section showing the grinding of the rough surface of the drilled glass-bonded mica sheet, the sheet being partially ground and polished.

It will be understood that the thicknesses of the sheet shown with respect to the tools and clamps shown are not particularly in scale and may be varied as desired. Although the various mica flakes are shown to lie in a limited number of horizontal planes in the drawing it will be understood that this is not necessarily the case. Although the mica flakes all lie in substantially parallel planes there is not necessarily any alignment of the different mica flakes in horizontal planes.

Referring now more specifically to the drawings, in Figure 1 we show a sheet of glass-bonded mica, 1, having generally two-dimensional flakes of mica, 2, relatively homogeneously distributed therethrough, said mica being bonded by glass binder 3. The sheet 1 has a rough orange peel surface 4 which in the prior art has always been removed by grinding before the drilling operation.

In Figure 2 we show a sheet 5 of glass-bonded mica, the orange peel surface being partially removed as shown at 6.

In Figure 3 we show a rough orange peel surfaced sheet of glass-bonded mica, 10, clamped with a template 15 on the upper surface thereof by means of a conventional clamp 16. An opening 18 in the template 15 predetermines the position of the hole which is to be drilled in and through the sheet 10. A conventional drill 19 driven by a suitable source of power, rotates and thereby cuts its way through the glass-bonded mica sheet 10. The debris 21 seen in the drilled opening is picked up from the upper orange peel surface 13 which is relatively frangible and this debris 21 acts as a grinding abrasive to produce a smooth ground side wall 22 (see Figure 5), for the opening or hole being drilled by the drill 19.

As shown in Figure 4, a sheet 30 of partially ground glass-bonded mica (see Figure 2) is clamped under template 31 by clamp 32. The template 31 is not required when a multiple-spindle drill press is used. A hole 33 is drilled by drill 34 through the sheet 30. In the drilling operation water, kerosene or any other liquid may be used as a coolant and lubricant, if desired. As the drill 34 emerges from the bottom surface of the sheet 30 it fractures the external orange peel lower surface 23.

But, as shown in Figure 5, since this surface 23 is ground away by the surface grinding wheel 25, the final glass-bonded mica sheet, designated as 26, is unharmed by this lower surface fracture, since a new smooth surface 27 is produced by the grinding in place of the orange peel surface 23 and a smooth upper surface 28 is produced by the surface grinding wheel 24.

The present invention can be carried out in one of two ways. Either the glass-bonded mica sheet can be drilled with the original rough orange peel surface 13 as it comes from the mold, as shown in Figure 3, or a fine cut can be taken from this rough orange peel surface and the partially surfaced sheet drilled as shown in Figure 4.

We have found further that by taking this fine cut, improved results are achieved because the sheet can be more accurately trued with respect to the drill than when no fine cut is taken.

The orange peel skin, which is ultimately removed from the glass-bonded mica sheet after the drilling, has a thickness of approximately .060 inch. To true this sheet for extremely accurate drilling we cut off approximately from .002 to .005 inch of this .060 inch orange peel skin, and the fine cut orange peel surfaced glass-bonded mica sheet is then clamped with a template for drilling.

It is understood, of course, that the skin may be completely removed from any portion of the product which does not need to be drilled, prior to drilling.

It will be understood that the new and unexpected results we obtain are partially due to the fact that we utilize the loose texture of the orange peel skin in a number of different ways. First, the interior of the glass-bonded mica sheet is a continuous well-bonded and closely knit vitreous mass. The orange peel skin is vitrified and a relatively loose mixture of glass and mica is formed. Accordingly, it will be understood that although chipping and fracturing readily occur when the drill enters the smooth closely knit vitreous glass and mica mix, as was the practice of the prior art, since the drill tends to dislodge the flakes of mica directly at the surface, when the drill enters the sheet via the rough pebbly skin according to the present invention, because that skin is not so densely packed and, hence, does not convey the stress in anything approximating the same amount as does the closely knit glass-bonded vitreous mixture that constitutes the interior of the sheet, likelihood of chipping and fracturing is very considerably reduced. Further, the transition of the stress is more gradual when the orange peel surface is drilled, than when the closely knit polished glass-bonded sheet is directly drilled.

Hence, it is not a question merely of causing the same fractures to occur in the rough orange peel skin that is to be removed, but more of reducing the likelihood of such fractures occurring by drilling through this loose and rough original orange peel skin.

Similarly, when this loose orange peel skin is reduced to a powdery debris and carried through with the drill, this powdery debris acts as an abrasive for the drill and provides a smooth ground surface for the interior of the drilled hole.

We claim:

1. The method of making a glass bonded mica product with at least one hole having a smooth internal wall therein, which comprises forming a glass-bonded mica product with a relatively rough orange peel skin thereon, drilling through said relatively rough orange peel skin and into said glass-bonded mica product, said drilled orange peel skin providing a debris, said debris acting as a grinding abrasive to form a relatively smooth inner wall surface for said drilled hole, and then grinding the rough orange peel skin off said drilled glass-bonded product.

2. The method of making a glass bonded mica product with at least one hole having a smooth internal wall therein, which comprises forming a glass-bonded mica product with a relatively rough orange peel skin thereon, applying a template to said rough surface glass-bonded mica product to predetermine the position of holes to be drilled therein, drilling through said relatively rough orange peel skin and into said glass-bonded mica product, said drilled orange peel skin providing a debris, said debris acting as a grinding abrasive to form a relatively smooth inner wall surface for said drilled hole, and then grinding the rough orange peel skin off said drilled glass-bonded product.

3. The method of making a glass bonded mica product with at least one hole having a smooth internal wall therein, which comprises forming a glass-bonded mica product with a relatively rough orange peel skin thereon, removing an external portion of said orange peel skin to provide a relatively true plane surface, drilling through said relatively rough orange peel skin and into said glass-bonded mica product, said drilled orange peel skin providing a debris, said debris acting as a grinding abrasive to form a relatively smooth inner wall surface for said drilled hole, and then grinding the rough orange peel skin off said drilled glass-bonded product.

ALBERT J. MONACK.
VERNE MUELLER.

REFERENCES CITED

The following references are of record in the file of this patent:

UNITED STATES PATENTS

| Number | Name | Date |
| --- | --- | --- |
| Re. 15,727 | Crossley | Dec. 4, 1923 |
| 996,398 | Buttler | June 27, 1911 |
| 1,219,461 | Johnston | Mar. 20, 1917 |
| 1,825,277 | Lytle | Sept. 29, 1931 |
| 2,032,239 | Wedlock | Feb. 25, 1936 |
| 2,303,244 | Wedlock | Nov. 24, 1942 |
| 2,309,831 | Devol et al. | Feb. 2, 1943 |